United States Patent [19]

Umezu

[11] Patent Number: 4,656,571

[45] Date of Patent: Apr. 7, 1987

[54] FREQUENCY CONVERTING DEVICE AND CONTROL METHOD THEREFOR

[75] Inventor: Kenji Umezu, Shizuoka, Japan

[73] Assignee: Kabushiki Kaisha Toshiba, Kawasaki, Japan

[21] Appl. No.: 736,948

[22] Filed: May 22, 1985

[30] Foreign Application Priority Data

May 25, 1984 [JP] Japan .................. 59-105952

[51] Int. Cl.$^4$ ................... H02M 5/45; G05F 5/00
[52] U.S. Cl. ....................... 363/37; 363/143; 323/299
[58] Field of Search ............ 363/35, 37, 142, 143, 363/98; 323/299, 300

[56] References Cited

U.S. PATENT DOCUMENTS

| | | | |
|---|---|---|---|
| 3,900,787 | 8/1975 | Köster | 363/143 X |
| 4,088,937 | 5/1978 | Uchida et al. | 363/142 X |
| 4,238,821 | 12/1980 | Walker | 363/37 X |
| 4,410,937 | 10/1983 | Uesugi | 363/132 |
| 4,513,362 | 4/1985 | Aizawa | 363/98 X |
| 4,516,664 | 5/1985 | Anzai et al. | 363/98 X |
| 4,545,464 | 10/1985 | Nomura | 363/37 X |
| 4,549,259 | 10/1985 | Ueda et al. | 363/35 X |
| 4,590,546 | 5/1986 | Maile | 323/299 X |

FOREIGN PATENT DOCUMENTS

| | | |
|---|---|---|
| 434417 | 11/1969 | Australia . |
| 537235 | 9/1982 | Australia . |
| 54-71404 | 12/1980 | Japan .................. 363/143 |
| 59-67873 | 4/1984 | Japan .................. 363/143 |
| 1299560 | 12/1972 | United Kingdom . |
| 1460756 | 1/1977 | United Kingdom . |
| 1524722 | 9/1978 | United Kingdom . |
| 2144931 | 3/1985 | United Kingdom . |

OTHER PUBLICATIONS

"Automatic Input-Selecting Power Supply", IBM Technical Disclosure Bulletin, vol. 28, No. 3, Aug. 1985.
Bose, Bimal K., "Adjustable Speed AC Drive Systems", IEEE Press, pp. 2-6.

Primary Examiner—Patrick R. Salce
Assistant Examiner—Emanuel Todd Voeltz
Attorney, Agent, or Firm—Schwartz, Jeffery, Schwaab, Mack, Blumenthal & Evans

[57] ABSTRACT

A frequency converting device is provided with a converter for converting ac input power into dc power. The device includes an inverter for inverting an output (dc power) of the converter into an ac output power, and adjustment device for adjusting an output waveform of the inverter in accordance with the voltage values of the ac input power. The adjustment device comprises a memory which stores adjustment data corresponding to the voltage value of the ac input power source connected to the converter, and a selector for selecting a certain adjustment data from the memory in accordance with the voltage value of the ac input power to which the device is connected. Thus, even when the voltage of the ac input power is changed, the effective output of the inverter can be kept substantially constant by adjusting on/off times of the switching elements constituting the inverter to vary a duty factor of the inverter output.

11 Claims, 9 Drawing Figures

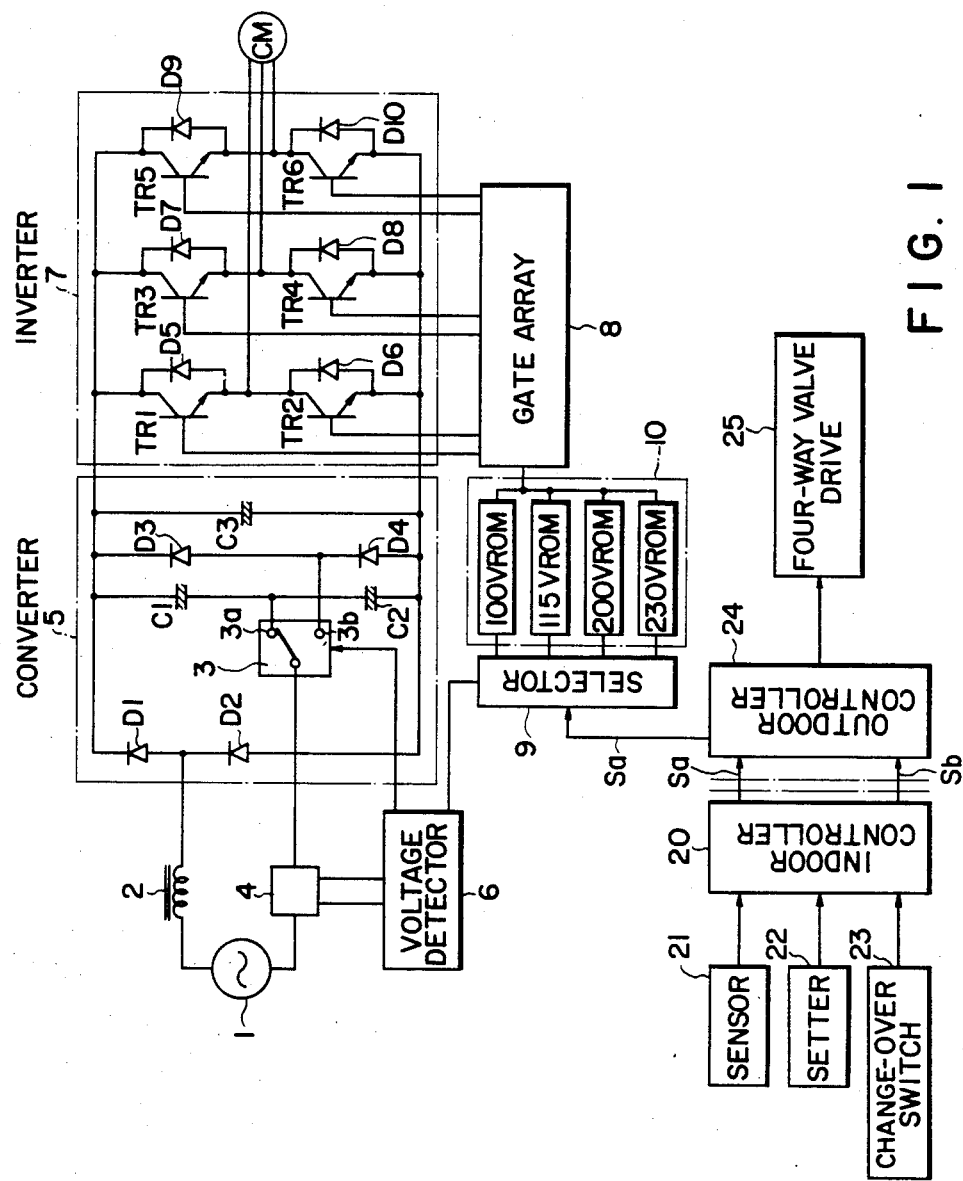
FIG. I

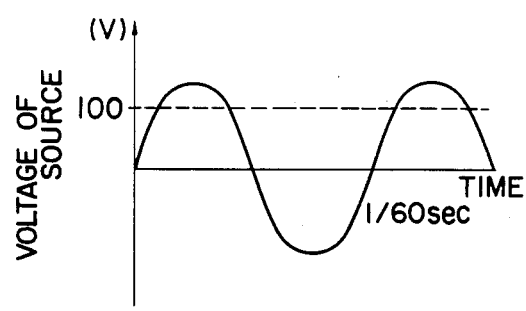
FIG. 2a
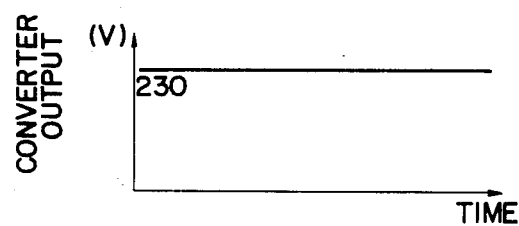
FIG. 2b
FIG. 2c
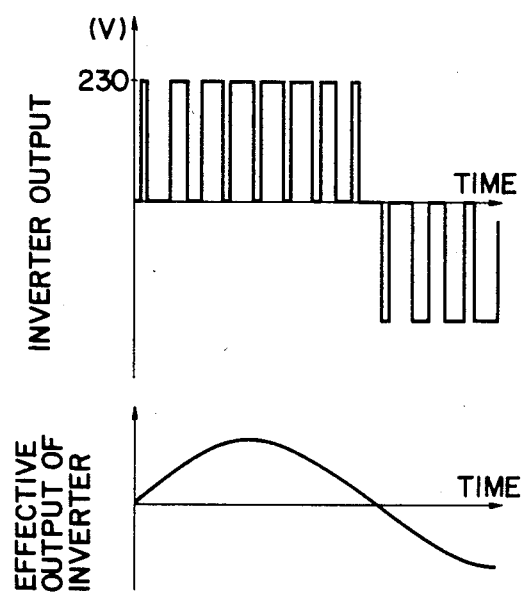
FIG. 2d

FREQUENCY CONVERTING DEVICE AND CONTROL METHOD THEREFOR

BACKGROUND OF THE INVENTION

The present invention relates to a frequency converting device, and more particularly to a frequency converter applied to a speed control (revolution number control) of an ac motor, e.g. an induction motor for use in an air conditioner, refrigerating device or the like.

For control of the revolution speed of an ac motor, e.g. an induction motor, there has been widely used a frequency converting device comprising in combination an inverter and a converter. In an air conditioning system, such as a home air conditioner, the refrigerating device or the like often utilizes the frequency converting device. For instance, the home air conditioner realizes an optimum air conditioning performance in responsive to the air conditioning load to accomplish improved comfort and energy savings.

Meanwhile, a commercial ac power supply for feeding power to a frequency converting device has different voltage values. For example, they are typically 100 V and 200 V in Japan. In some other countries, typical voltage values are 115 V and 230 V. For this reason, different types of air conditioners, refrigerating devices or the like had to be provided in accordance with the voltage values of the commercially available power supplies. This has been an obstacle in improving the efficiency of manufacture, sale, etc.

On the other hand, frequency converting devices with PWM (pulse width modulation) control system have heretofore been widely known. For instance, U.S. Pat. No. 4,410,937 to Michika Uesugi teaches a technique in which a signal for controlling a three phase inverter is stored in a ROM (read only memory) of a relatively small capacity. Further, in the paper entitled "Relationship between output waveform of PWM inverter and gate control signal" by Takahashi et al., (Journal of Japanese electric society Vol. 95, No. 2, Feb., 1975), there is exhibited a theoretical analysis in regard to improvement in the relationship between output waveform of a PWM inverter and the load terminal voltage or output voltage waveform, etc. However, these prior teachings do not take into consideration the adjustment of the inverter output in accordance with voltage values of the commercial power source.

There is also known a method of converting a voltage value of a power source into a desired value by using a transformer. However, because this method requires the transformer, the device is large and heavy, and has a large energy loss.

SUMMARY OF THE INVENTION

A first object of the present invention is to ensure that an effective value of an ac output power supplied from a frequency converting device to an ac motor is kept substantially constant, even when the converting device is connected to ac power sources with different voltages.

A second object of the present invention is to make it possible to suppress an energy loss of a frequency converting device which can properly operate an ac motor regardless of the voltage values of the ac power sources connected to the device.

A third object of the present invention is to provide the above-featured frequency converting features in a device which is small and light.

To achieve these objects, the present invention provides a frequency converting device in which data for adjusting the on/off time of the switching elements constituting an inverter are stored in advance in a ROM corresponding to the ac power sources to adjust the on/off time of the switching elements in accordance with adjustment data corresponding to the voltage value of the ac power source. This technique ensures that an effective output of the inverter is kept substantially constant regardless of the voltage value of the ac power source connected to the device.

BRIEF DESCRIPTION OF THE DRAWINGS

FIG. 1 is a circuit diagram illustrating an embodiment of a frequency converting device according to the present invention; and FIGS. 2 and 3 show waveforms for explaining the operation of the embodiment of the frequency converting device shown in FIG. 1, respectively.

DETAILED DESCRIPTION OF THE PREFERRED EMBODIMENT

Figure 3A:
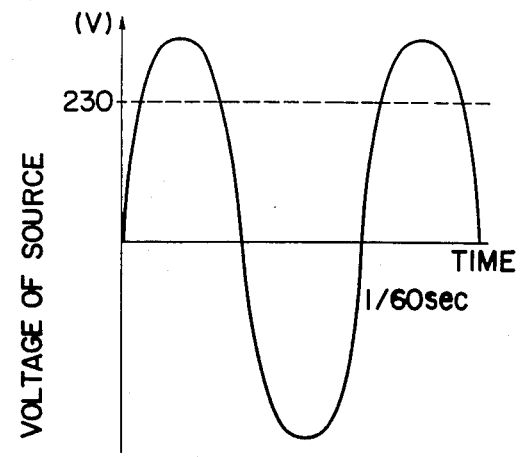
Figure 3B:
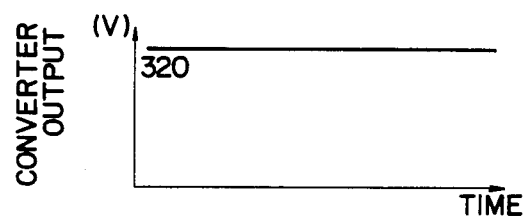

FIG. 1 shows an embodiment of a frequency converting device according to the present invention which can be connected to any of a plurality of ac power sources having different voltage values of, for example, 100 V, 115 V, 200 V and 230 V. The ac input power from the ac power source 1 is fed to a converter 5 through a reactor 2 and a voltage detector 4. The converter 5 comprises bridge-connected four rectifier diodes $D_1$ to $D_4$, a power supply change-over switch 3, capacitors $C_1$ and $C_2$ for voltage doubler rectification, and a smoothing capacitor $C_3$. The voltage detector 4 has an output terminal connected to a voltage detector 6. The switch 3 is operative in dependence upon a voltage value of the voltage detector 6.

Namely, when the voltage value of the ac power source 1 connected to the device is 100 V or 115 V, the contact of the switch 3 is connected to a terminal $3a$, thus forming a voltage doubler rectifier circuit comprising rectifier diodes $D_1$ and $D_2$ and capacitors $C_1$ and $C_2$. On the other hand, when the voltage value of the ac power source 1 is 200 V or 230 V, the contact of the switch 3 is connected to a terminal $3b$, thus forming a bridge rectifier circuit comprising rectifier diodes $D_1$ to $D_4$.

An output (dc power) of the converter 5 is supplied to an inverter 7. The inverter 7 comprises npn transistors TR1 to TR6 serving as switching elements, and diodes $D_5$ to $D_{10}$ inversely connected in parallel with the transistors TR1 to TR6, respectively. A gate array 8 is operative to deliver gate signals to bases of the transistors TR1 to TR6, respectively. Thus, the switching operation of the transistors is effected to produce a pulse signal of e.g. 4 KHz. The pulse width of the pulse signal corresponds to each on-time of the transistors TR1 to TR6.

The voltage detector 6 is also operative to deliver a select signal to a selector 9. The selector 9 is operative to select one of four ROMs (Read Only Memories) labelled as 100VROM, 115VROM, 200VROM and 230VROM constituting a memory 10 in accordance with a signal indicating one of ac input power supply voltages of 100 V, 115 V, 200 V and 230 V. Data related to adjustment of each on-time of the transistors TR1 to TR6, i.e., data related to adjustment of a pulse width of an output pulse of the inverter 7, are stored in the four ROMs, respectively.

Inside the room in which air is conditioned, there are provided an indoor controller 20, a room temperature sensor 21, a temperature setter 22 and an air-conditioner change-over switch 23 which are connected to the indoor controller 20. Outside the room, there are provided an outdoor controller 24 and a four-way valve drive circuit 25. Fed from the indoor controller 20 to the outdoor controller 24 are a frequency command signal Sa related to rotational speed of an ac motor and an air-conditioning signal Sb for changing over the four-way valve.

The operation of the embodiment shown in FIG. 1 will be described with reference to FIGS. 2 and 3. FIG. 2 shows waveforms when the ac input power of the ac power source 1 has a voltage value of 100 V and a frequency of 60 Hz wherein FIG. 2a shows a voltage waveform of the input power. In this instance, because the contact of the power supply change-over switch 3 is connected to the terminal 3a, the converter 5 becomes operative to serve as a voltage doubler rectifier circuit to output a dc power of 230 V as shown in FIG. 2b. The selector 9 becomes operative to select the 100VROM of the memory 10.

The 100VROM stores data in regard to pulse width of an output from the inverter 7 in the case where the voltage value of the ac input power from the ac power source 1 is 100 V. The frequency command signal Sa corresponding to the waveform shown in FIG. 2 is fed to the 100VROM through the selector 9. Thus, the gate array 8 becomes operative to adjust a pulse width as shown in FIG. 2c in accordance with the data from the 100VROM, thereby to control on/off operation of the transistors TR1 to TR6 so that an ac waveform as shown in FIG. 2d is obtained as an effective value. At this time, the inverter 7 produces an output pulse signal having an amplitude of 230 V.

FIG. 3 shows a waveform which occurs when the ac input power of the ac power source 1 has a voltage value of 230 V and a frequency of 60 Hz wherein FIG. 3a shows a voltage waveform of the input power. In this instance, because the contact of the switch 3 is connected to the terminal 3b, the converter 5 becomes operative to function as a bridge rectifier circuit to produce a dc power of 320 V as shown in FIG. 3b. The selector 9 becomes operative to select the 230VROM of the memory 10.

Figure 3C:
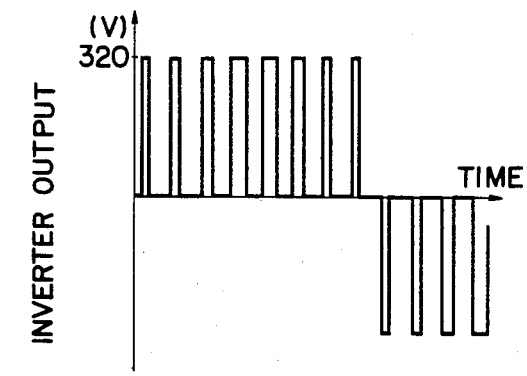
Figure 3D:
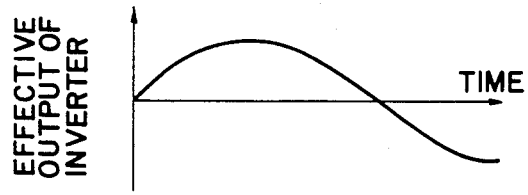

The 230VROM stores data related to adjustment of a pulse width of an output from the inverter 7 in the case where the voltage value of the ac input power from the ac power source 1 is 230 V. Further, the frequency command signal Sa corresponding to the waveform shown in FIG. 3d is delivered to the 230VROM through the selector 9. The gate array 8 becomes operative to adjust a pulse width as shown in FIG. 3c in accordance with data from the 230VROM to control on/off operation of the transistors TR1 to TR6 so that an ac waveform as shown in FIG. 3d is obtained as an effective value. At this time, the inverter 7 produces an output pulse signal having an amplitude of 320 V.

A comparative study on the waveforms shown in FIGS. 2 and 3 is now made. In the case shown in FIG. 2, the converter 5 is operative to produce a dc output power of 230 V, while in the case shown in FIG. 3, it is operative to produce a dc output power of 320 V. Accordingly, as apparent from FIGS. 2c and 3c, the inverter 7 produces output pulse signals having amplitudes of 230 V and 320 V which are different from each other, respectively. For this reason, in order to obtain an ac power having the same voltage value as shown in FIGS. 2d and 3d, it is necessary to adjust the pulse widths $T_{100}$ and $T_{230}$ of the output pulse signal from the inverter 7.

Assuming now that the output pulse signal of the inverter 7 is 4 KHz, comparative study on the pulse width when the power supply voltage is 100 V or 230 V is made in a modeling form. When the power supply voltage is 100 V as shown in FIG. 2, the pulse width $T_{100}$ is expressed as $$T_{100} = (1/4000) \sin \theta.$$

In contrast, when the power supply voltage is 230 V as shown in FIG. 3, the pulse width $t_{230}$ is expressed as $$T_{230} = (1/4000) \sin \theta \times (230/320).$$

Namely, by adjusting on-times of the transistors TR1 to TR6 so that the ratio of the pulse widths $T_{100}$ and $T_{230}$ becomes equal to 1/1.39, it is possible to keep an effective output substantially constant even if the ac input power source is switched to a power source having the different voltage, thus making it possible to properly operate the ac motor.

In the above-mentioned embodiment, it is described that the device is connectable to one of four ac power sources having different voltages of 100 V, 115 V, 200 V and 230 V. However, the voltage value of the ac power source being connectable to the device is not limited to such values. The switching of the voltage value by the power changeover switch may be effected so that e.g. 200 V is converted into 100 V by removing two diodes for voltage doubler rectification or cutting off the circuit. The memory means for storing adjustment data is not limited to a ROM. The memory means and the selector, etc. may be integrally configured by using a microprocessor, RAM (random access memory), etc. Further, it is not essential to the present invention to effect switching of the voltage doubler rectification and the bridge rectification by using the power supply change-over switch. Namely, the present invention can provide the same advantages by using means which controls the on/off operation of the switching element based on the adjustment data stored in the memory.

As stated above, the frequency converting device according to the present invention can provide a constant power supply to a load circuit e.g. a compressor, a fan motor, and a four-way valve, etc. even in the case of different power supply voltages (e.g. when the voltage value of the ac commercial power source connected to the device is different from the rating voltages of the device, or when an effective value is lowered depending on the area where the frequency converter is installed etc.), thus enabling the single device to be adapted for two or more different voltages of commercial power sources. Further, as compared to a system in which a power is converted with a transformer, etc., the system according to the present invention has less energy loss, and can be small in size and light in weight.

What is claimed is:

1. A frequency converting device connectable to a plurality of ac input power sources having voltages different from each other and for variably controlling a rotational speed of an ac motor when the device is connected to one of said ac input power sources, comprising:
(a) a converter for converting an ac input power from said ac input power source connected to the device into a dc power;
(b) an inverter provided with a plurality of switching elements to convert said dc power into an ac output power by controlling on and off operation of said switching elements and to supply said ac output power to said ac motor; and
(c) adjusting means for adjusting a ratio of on-time and off-time of said switching elements based on said ac input voltage supplied to said converter for keeping substantially constant an effective output value of said inverter regardless of the voltage of the ac input power source to which the device is connected.

2. A frequency converting device as set forth in claim 1, which further comprises detector means for detecting a voltage value of said ac input power source connected to the device, said adjusting means being operative to adjust a ratio of on-time and off-time of said switching elements based on the output signal of said detector means.

3. A frequency converting device as set forth in claim 2, wherein said converter comprises a plurality of bridge-connected diodes, at least one smoothing capacitor, at least two capacitors for voltage doubler rectification, and switch means for switching the operational mode of said converter to a first mode to cause said converter to function as a bridge rectifier or to a second mode to cause it to function as a voltage doubler rectifier, said switching means being operative in accordance with the output signal of said detector means.

4. A frequency converting device as set forth in claim 1, wherein said adjusting means comprises:
(a) memory means for storing adjustment data for adjusting said ratio of on-time and off-time of said switching elements for the respective ac input power sources; and
(b) control means for controlling said on-off operations of said switching elements in accordance with said adjustment data which corresponds to one of said input ac power sources connected to the device.

5. A frequency converting device as set forth in claim 1, which further comprises detector means for detecting a voltage value of said ac input power source connected to the device and providing an output signal corresponding thereto, said adjustment means comprising memory means for storing adjustment data for adjusting said ratio of on-time and off-time of said switching elements for the respective ac input power sources, selector means for selecting the adjustment data which corresponds to one of said ac input power sources connected to the device in accordance with the output signal of said detector means, and control means for controlling said on-off operations of said switching elements in accordance with the selected adjustment data.

6. A frequency converting device as set forth in claim 5, wherein said memory means comprises a read only memory.

7. A frequency converting device as set forth in claim 1, which further comprises detector means for detecting a voltage value of said ac input power source connected to the device and providing an output signal corresponding thereto,
said converter comprising switch means for switching the mode of operation to a first mode to cause said converter to function as a bridge rectifier or to a second mode to cause said converter to function as a voltage doubler rectifier, said switching means being operative to switch the mode of operation in such a manner that said converter functions as said bridge rectifier when the voltage value detected by said detector means is above a predetermined value, and being operative to switch the mode of operation in such a manner that said converter functions as a voltage doubler rectifier when the voltage value detected by said detector means is below said predetermined value,
said adjusting means comprising memory means for storing adjustment data for adjusting said ratio of on-time and off-time of said switching elements for the respective ac input power sources, selector means for selecting the adjustment data which corresponds to one of said ac input power sources connected to the device in accordance with the output signal of the detector means, and control means for controlling on-off operations of said switching elements in accordance with the selected adjustment data.

8. A frequency converting device as set forth in claim 7, wherein said memory means comprises a read only memory.

9. A frequency converting device as set forth in claim 7, wherein said control means comprises a gate array.

10. A frequency converting device as set forth in claim 7, wherein the device is connectable to four different ac input power sources having voltage values of 100 V, 115 V, 200 V and 230 V respectively, said switch means is operative to cause said converter to function as a voltage doubler rectifier when the output signal of said detector means indicates 100 V or 115 V, and is operative to cause said converter to function as a bridge rectifier when the output signal of said detector means indicates 200 V or 230 V, and the adjustment data corresponding to four different ac input power sources of 100 V, 115 V, 200 V and 230 V are stored in said memory means.

11. A control method for a frequency converting device comprising a converter connectable to a plurality of ac input power sources having voltages different from each other, and an inverter including a plurality of switching elements for converting a dc power from said converter into an ac output power, comprising:
(a) storing in a read only memory adjustment data for adjusting a ratio of on-time and off-time of said switching elements for the respective ac input power sources so that an effective value of an output from said inverter is kept substantially constant regardless of the ac input power source to which said converting device is connected;
(b) detecting a voltage value of said ac input power source connected to said converter;
(c) selecting adjustment data corresponding to the ac power source connected to said converter from a plurality of adjustment data stored in said read only memory in accordance with said detected voltage value; and
(d) effecting a control of on-time and off-time of said switching elements in accordance with the selected adjustment data.

* * * * *